Sept. 2, 1969   L. A. M. PHELAN   3,464,220
MACHINE FOR MAKING FROZEN CONFECTION
Filed Feb. 12, 1968
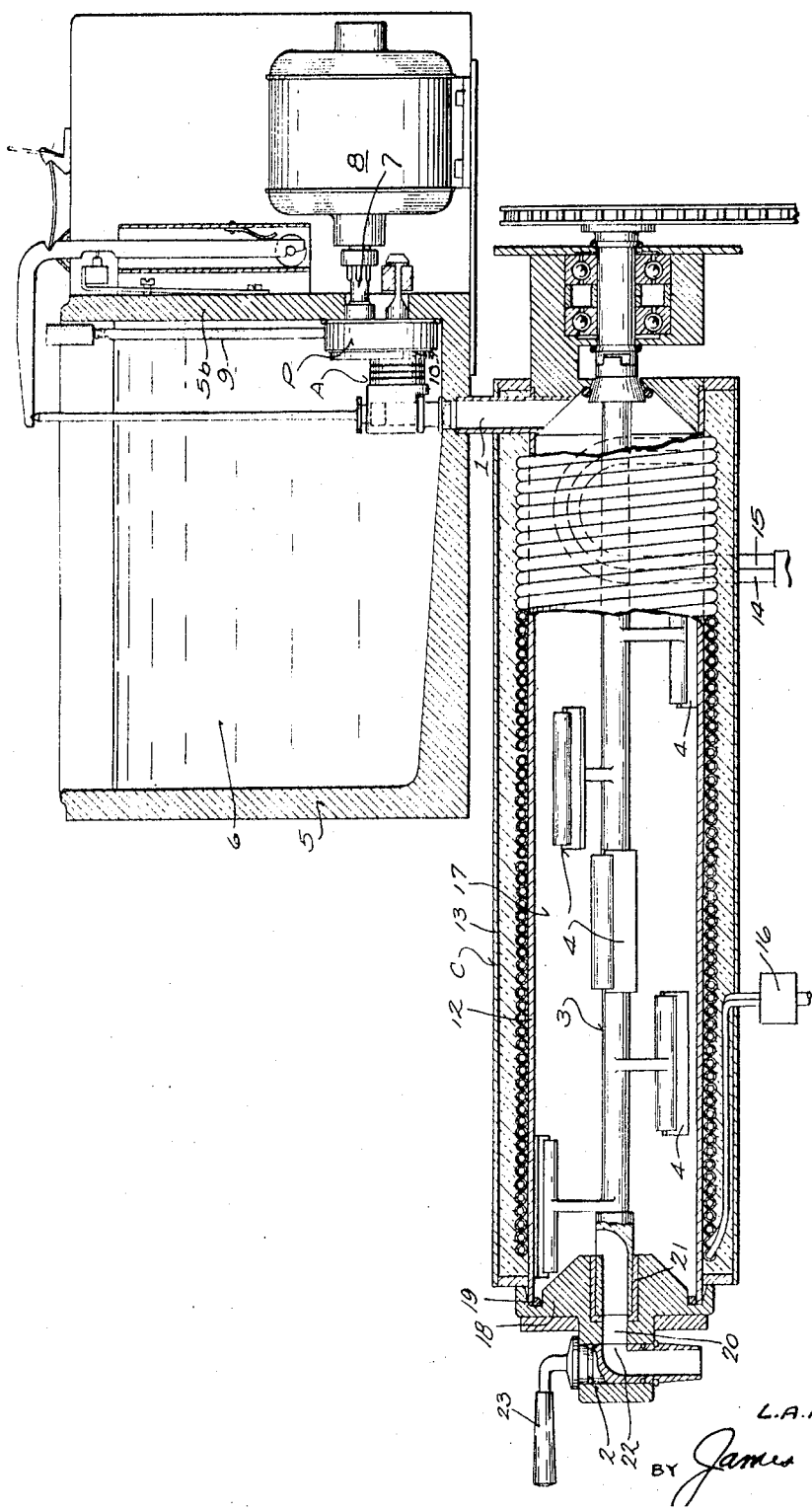
INVENTOR
L.A.M. PHELAN
BY James E. Nilles
ATTORNEY 3,464,220
MACHINE FOR MAKING FROZEN CONFECTION
Louis A. M. Phelan, Roscoe, Ill. 61073
Filed Feb. 12, 1968, Ser. No. 704,788
Int. Cl. F25c 7/10
U.S. Cl. 62—342     2 Claims

ABSTRACT OF THE DISCLOSURE

This invention relates generally to freezers for confection such as soft ice cream, custards, malteds, or the like, in which mix and air are fed into one end of a refrigerated cylinder through which it passes as it is brought down to proper temperature and is then drawn off from the other end of the cylinder by means of a serving valve. The freezer has a plurality of relatively small diameter evaporator coils connected in parallel to provide more intimate and complete contact with the cylinder.

BACKGROUND OF THE INVENTION

Field of the invention

The invention pertains to refrigeration equipment of the type for producing a modified congealed product such as soft ice cream or custards, and more particularly to the coils for conducting refrigerant around the freezer cylinder.

Prior Art

The invention is in the nature of an improvement over the freezer shown in the U.S. Patent 2,930,203, issued Mar. 29, 1960, to L. E. Koch, and which describes the problems involved in and necessity for precisely controlling the temperature of the product being made.

SUMMARY OF THE INVENTION

The invention relates to a freezer for soft ice cream and the like in which mix is fed into one end of the freezer cylinder and then passes through the cylinder and is ejected out the other end as a finished product, the cylinder having a plurality of relatively small diameter refrigerant coils wrapped therearound and bonded thereto. The coils are connected in parallel between the vacuum side and the pressure side of a refrigeration system. With this invention, more intimate contact is possible between the coils and cylinder, resulting in greatly increased refrigerating ability, and at the same time maintaining a good rate of flow of the refrigerant around the cylinder.

These and other objects and advantages of the present invention will appear as this disclosure progresses.

BRIEF DESCRIPTION OF THE DRAWING

The drawing is a longitudinal, cross sectional view through a freezer embodying the present invention, certain parts being shown as broken away for clarity in the drawing.

DESCRIPTION OF THE PREFERRED EMBODIMENT

As shown in the drawing, the general arrangement includes a freezing cylinder C which has an inlet conduit 1 at its rear end and a serving valve 2 at its front or discharge end. A scraper assembly 3 is rotatably mounted in the cylinder and has a series of scraper blades 4 which act, as the assembly slowly rotates, to scrape and keep the inner wall of the cylinder exposed to contact by the partially frozen or warmer material. The assembly 3 also gently mixed the freshly scraped material with the warmer surrounding material.

A mix tank 5 is secured above the cylinder for holding a supply of mix 6, and a gear pump P is located in the bottom of the tank and is driven by electric motor 8 which is coupled to pump shaft 7. The pump is sealed against the tank back wall 5b.

As the pump gears rotate, air is drawn downwardly through the inlet pipe 9, and into the pump; at the same time mix is also drawn into the pump through a hole 10 from the tank. The air and mix are then forced by the pump through a converter A which forms the mixture into a highly stable aerated mass, which then passes into the freezing cylinder C via the inlet 1. The mass is held in the cylinder under pressure while cooling and is subjected to very gentle agitation by the slowly rotating scraper.

FREEZING CYLINDER ASSEMBLY

Turning now to a more detailed description of the drawing, the cylinder assembly C is elongated and horizontally disposed and includes an inner cylinder 12 around which is sealed the concentric outer cylinder 13. The pair of refrigeration coils 14 and 15 which are wrapped around and bonded to the outside diameter of the inner cylinder form an evaporator through which refrigerant passes from the expansion valve 16 as two essentially equal and parallel streams. When leaving the coils 14 and 15, these refrigerant streams are mainly gaseous and here they converge as a single stream. This stream is directed to two valves (not shown) which serve automatically to control the evaporator temperature. From these valves, the refrigerant passes through a heat exchanger (not shown) and then to the suction side of a refrigeration compressor (not shown) in the known manner.

Using a plurality of evaporator coils in parallel, in place of the conventional single coil, provides a shorter and broader heat conduction path which leads from the mass being cooled to the refrigerant. These coils are of small diameter and are bonded to the cylinder by a high conductive material, such as being silver soldered or copper brazed to the cylinder. This construction considerably reduces the outside diameter, the weight and the cost of the evaporator. In part because of better oil return characteristics, this construction improves evaporator efficiency. Among other advantages of this construction is that of rapid response to the varying cooling requirements of the mass being processed.

The front end of the freezing cylinder 17 is closed by the cover 18 which is sealed by the O-ring 19 with the inner cylinder. The central portion of the cover has a horizontal discharge passage 20 in which is located a bearing sleeve 21. A draw valve 2 is rotatable about a vertical axis in the end of the cover and has a horizontal bore 22 which is alignable with the passage 20 when the handle 23 is turned to the product discharge position shown, whereby the product is forced from the pressurized freezing chamber.

I claim:
1. A frozen confection machine comprising an elongated refrigerated freezing cylinder having a rear end and a front end; means for supplying liquid mix to said cylinder adjacent said rear end thereof, a draw-off valve adjacent said front end, means for moving a mix from said rear end to said front end, a plurality of separate coils arranged in parallel and wrapped tightly together in side by side relationship and around said cylinder and fusion bonded to the periphery of said cylinder for substantially the entire length thereof and through which coils refrigerant can pass to refrigerate said cylinder and cool the mix therein as it passes along the length of said cylinder, and an outer cylinder around and concentric with said cylinder and sealed therewith, said coils being located within an annular space between said cylinders.

2. The machine set forth in claim 1 including an expansion valve at the refrigerant entry end of said coils and located adjacent the front end of said cylinder, and through which valve the refrigerant passes.

References Cited

UNITED STATES PATENTS

| | | | |
|---|---|---|---|
| 345,059 | 7/1886 | Johnson | 62—525 X |
| 2,587,127 | 2/1952 | Erickson et al. | 62—343 X |
| 2,629,228 | 2/1953 | Bergmann. | |
| 2,645,911 | 7/1953 | Martin | 62—343 |
| 2,958,212 | 11/1960 | Cohrt | 62—518 X |
| 3,317,198 | 5/1967 | Phelan et al. | 62—342 X |

WILLIAM E. WAYNER, Primary Examiner

U.S. Cl. X.R.

62—524; 165—169